(12) United States Patent
Bravery et al.

(10) Patent No.: US 9,104,514 B2
(45) Date of Patent: Aug. 11, 2015

(54) AUTOMATED DEPLOYMENT OF APPLICATIONS WITH TENANT-ISOLATION REQUIREMENTS

(75) Inventors: Andrew James Frederick Bravery, Salisbury (GB); Arun Kwangil Iyengar, Yorktown Keights, NY (US); Aaron Edward Kasman, New York, NY (US); Thomas Arthur Mikalsen, New York, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 13/004,402

(22) Filed: Jan. 11, 2011

(65) Prior Publication Data

US 2012/0180039 A1 Jul. 12, 2012

(51) Int. Cl.
*G06F 9/445* (2006.01)
*G06F 9/50* (2006.01)
*G06F 9/455* (2006.01)
*G06F 21/53* (2013.01)

(52) U.S. Cl.
CPC .............. *G06F 8/60* (2013.01); *G06F 9/45504* (2013.01); *G06F 9/45533* (2013.01); *G06F 9/45537* (2013.01); *G06F 9/5077* (2013.01); *G06F 21/53* (2013.01)

(58) Field of Classification Search
None
See application file for complete search history.

(56) References Cited

U.S. PATENT DOCUMENTS

| | | | | |
|---|---|---|---|---|
| 5,067,072 A | * | 11/1991 | Talati et al. | 717/148 |
| 5,187,790 A | * | 2/1993 | East et al. | 719/316 |
| 5,201,049 A | * | 4/1993 | Shorter | 718/1 |
| 5,347,578 A | * | 9/1994 | Duxbury | 707/781 |
| 5,696,975 A | * | 12/1997 | Moore et al. | 717/168 |
| 5,758,124 A | * | 5/1998 | Ogata et al. | 703/27 |
| 5,828,840 A | * | 10/1998 | Cowan et al. | 709/203 |
| 5,903,752 A | * | 5/1999 | Dingwall et al. | 718/103 |
| 6,023,721 A | * | 2/2000 | Cummings | 709/201 |
| 6,453,334 B1 | * | 9/2002 | Vinson et al. | 709/203 |

(Continued)

OTHER PUBLICATIONS

"Designing Secure Multi-Tenancy into Virtualized Data Centers", VMWare, 2009, <http://www.vmware.com/files/pdf/partners/netapp/Designing_Secure_Multi-Tenancy_into_Virtualized_Data.Center.pdf>, pp. 1-82.*

(Continued)

*Primary Examiner* — Thuy Dao
*Assistant Examiner* — Samuel Hayim
(74) *Attorney, Agent, or Firm* — Cahn & Samuels, LLP

(57) ABSTRACT

An embodiment of the invention provides a method for multi-tenant enabling a service, where the service includes a plurality of service components. Rules are received from a provider of the service, wherein the rules include rules for isolating the service components and rules for sharing the service components. The service components are matched with virtualization environments and/or physical environments based on the rules. The virtualization environments include at least one isolation container and/or at least one shared container. The service components are stored in the virtualization environments and/or the physical environments based on the matching. The service components are mapped to the at least one isolation container of the virtualization environments, the at least one shared container of the virtualization environments, and/or the physical environments based on the storing of the service components.

19 Claims, 12 Drawing Sheets

(56) References Cited

U.S. PATENT DOCUMENTS

| | | | |
|---|---|---|---|
| 6,546,554 B1* | 4/2003 | Schmidt et al. | 717/176 |
| 6,597,366 B1* | 7/2003 | Bennett et al. | 345/619 |
| 6,760,815 B1* | 7/2004 | Traversat et al. | 711/135 |
| 7,676,813 B2* | 3/2010 | Bisset et al. | 719/318 |
| 8,090,797 B2* | 1/2012 | Chinta et al. | 709/217 |
| 2001/0034736 A1* | 10/2001 | Eylon et al. | 707/200 |
| 2002/0019972 A1* | 2/2002 | Grier et al. | 717/3 |
| 2002/0078203 A1* | 6/2002 | Greschler et al. | 709/225 |
| 2003/0035010 A1* | 2/2003 | Kodosky et al. | 345/771 |
| 2003/0101292 A1* | 5/2003 | Fisher et al. | 709/328 |
| 2003/0149963 A1* | 8/2003 | Sandham et al. | 717/138 |
| 2004/0111578 A1* | 6/2004 | Goodman et al. | 711/163 |
| 2004/0139202 A1* | 7/2004 | Talwar et al. | 709/229 |
| 2004/0221273 A1* | 11/2004 | Sandham et al. | 717/134 |
| 2004/0268324 A1* | 12/2004 | Walker | 717/138 |
| 2005/0091655 A1* | 4/2005 | Probert et al. | 718/100 |
| 2006/0070030 A1* | 3/2006 | Laborczfalvi et al. | 717/120 |
| 2006/0075080 A1* | 4/2006 | Burr et al. | 709/223 |
| 2006/0075381 A1* | 4/2006 | Laborczfalvi et al. | 717/100 |
| 2006/0085789 A1* | 4/2006 | Laborczfalvi et al. | 718/100 |
| 2006/0174223 A1* | 8/2006 | Muir et al. | 717/106 |
| 2006/0265714 A1* | 11/2006 | Bissett et al. | 718/104 |
| 2007/0094667 A1* | 4/2007 | Bissett et al. | 718/104 |
| 2007/0171921 A1* | 7/2007 | Wookey et al. | 370/401 |
| 2007/0174410 A1* | 7/2007 | Croft et al. | 709/208 |
| 2007/0174429 A1* | 7/2007 | Mazzaferri et al. | 709/218 |
| 2007/0180448 A1* | 8/2007 | Low et al. | 718/1 |
| 2007/0180449 A1* | 8/2007 | Croft et al. | 718/1 |
| 2007/0180450 A1* | 8/2007 | Croft et al. | 718/1 |
| 2007/0180493 A1* | 8/2007 | Croft et al. | 726/2 |
| 2007/0186212 A1* | 8/2007 | Mazzaferri et al. | 718/1 |
| 2008/0005361 A1* | 1/2008 | Taha et al. | 710/1 |
| 2009/0055834 A1* | 2/2009 | Ding et al. | 718/104 |
| 2009/0271498 A1* | 10/2009 | Cable | 709/219 |
| 2009/0271607 A1* | 10/2009 | Karve et al. | 713/100 |
| 2010/0030896 A1* | 2/2010 | Chandramouli et al. | 709/224 |
| 2010/0077449 A1 | 3/2010 | Kwok et al. | |
| 2010/0281102 A1 | 11/2010 | Chinta et al. | |

OTHER PUBLICATIONS

Saurabh Barjatiya et al., "BlueShield: A Layer 2 Appliance for Enhanced Isolation and Security Hardening among Multi-tenant Cloud Workloads", IEEE, 2009, <http://ieeexplore.ieee.org/stamp/stamp.jsp?tp=&arnumber=6424946>, pp. 1-4.*

Patrick Colp et al., "Breaking Up is Hard to Do: Security and Functionality in a Commodity Hypervisor", ACM, 2011, <http://delivery.acm.org/10.1145/2050000/2043575/p189-colp.pdf>, pp. 1-14.*

* cited by examiner

| VE Container | Service Component |
|---|---|
| IC1 | A B D |
| IC2 | |
| SC1 | C |
| | |
| IC1 | A |
| IC2 | B D |
| SC1 | C |
| | |
| IC1 | B |
| IC2 | A D |
| SC1 | C |
| | |
| IC1 | D |
| IC2 | A B |
| SC1 | C |
| | |
| IC1 | A B D |
| IC2 | |
| SC1 | C |
| | |
| IC1 | A B |
| IC2 | D |
| SC1 | C |
| | |
| IC1 | A D |
| IC2 | B |
| SC1 | C |
| | |
| IC1 | B D |
| IC2 | A |
| SC1 | C |

FIG. 5A

| VE Container | Service Component |
|---|---|
| IC1 | |
| IC2 | A B D |
| SC1 | C |
| | |
| IC1 | B D |
| IC2 | A |
| SC1 | C |
| | |
| IC1 | A D |
| IC2 | B |
| SC1 | C |
| | |
| IC1 | A B |
| IC2 | D |
| SC1 | C |
| | |
| IC1 | D |
| IC2 | A B |
| SC1 | C |
| | |
| IC1 | B |
| IC2 | A D |
| SC1 | C |
| | |
| IC1 | A |
| IC2 | B D |
| SC1 | C |

FIG. 5B

AUTOMATED DEPLOYMENT OF APPLICATIONS WITH TENANT-ISOLATION REQUIREMENTS

BACKGROUND

The present invention is in the field of systems, methods, and computer program products for automated deployment of applications with tenant-isolation requirements.

Software-as-a-Service (SaaS) lowers the cost of development, customization, deployment, and operation of a software application while supporting multiple tenants over the Internet. In general, SaaS is associated with business software applications. SaaS is a Web-based software application deployed and operated as a hosted service over the Internet and accessed by users.

In the SaaS business model, the ownership, technology infrastructure and management responsibility of the application has moved to application service providers (ASPs) from tenants or customers. It benefits ASPs by reducing hosting cost due to customization and scalability with increasing number of tenants or customers. It also benefits the tenants or customers through their saving in money and time. Tenants can gain immediate access to the latest IT innovations and improvements provided by the ASP without spending their own IT budgets. The cost to use the application can be a per user basis and pay-as-you-go.

SUMMARY OF THE INVENTION

An embodiment of the invention provides a system and method for multi-tenant enabling a service, where the service includes a plurality of service components. More specifically, an interface receives rules from a provider of the service, wherein the rules include rules for isolating the service components and rules for sharing the service components. A configuration module connected to the interface matches the service components with virtualization environments and/or physical environments based on the rules. The virtualization environments include at least one isolation container and/or at least one shared container.

A storage module connected to the configuration module stores the service components in the virtualization environments and/or the physical environments based on the matching. A mapping module connected to the storage module maps the service components to the at least one isolation container of the virtualization environments, the at least one shared container of the virtualization environments, and/or the physical environments based on the storing of the service components. The system further includes a second interface for receiving a request for the service from an end-user. A router connected to the second interface routes the request to the service components based on the mapping.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIGS. 5A and 5B are tables illustrating different matching scenarios according to an embodiment of the invention;

DETAILED DESCRIPTION

Figure 1:
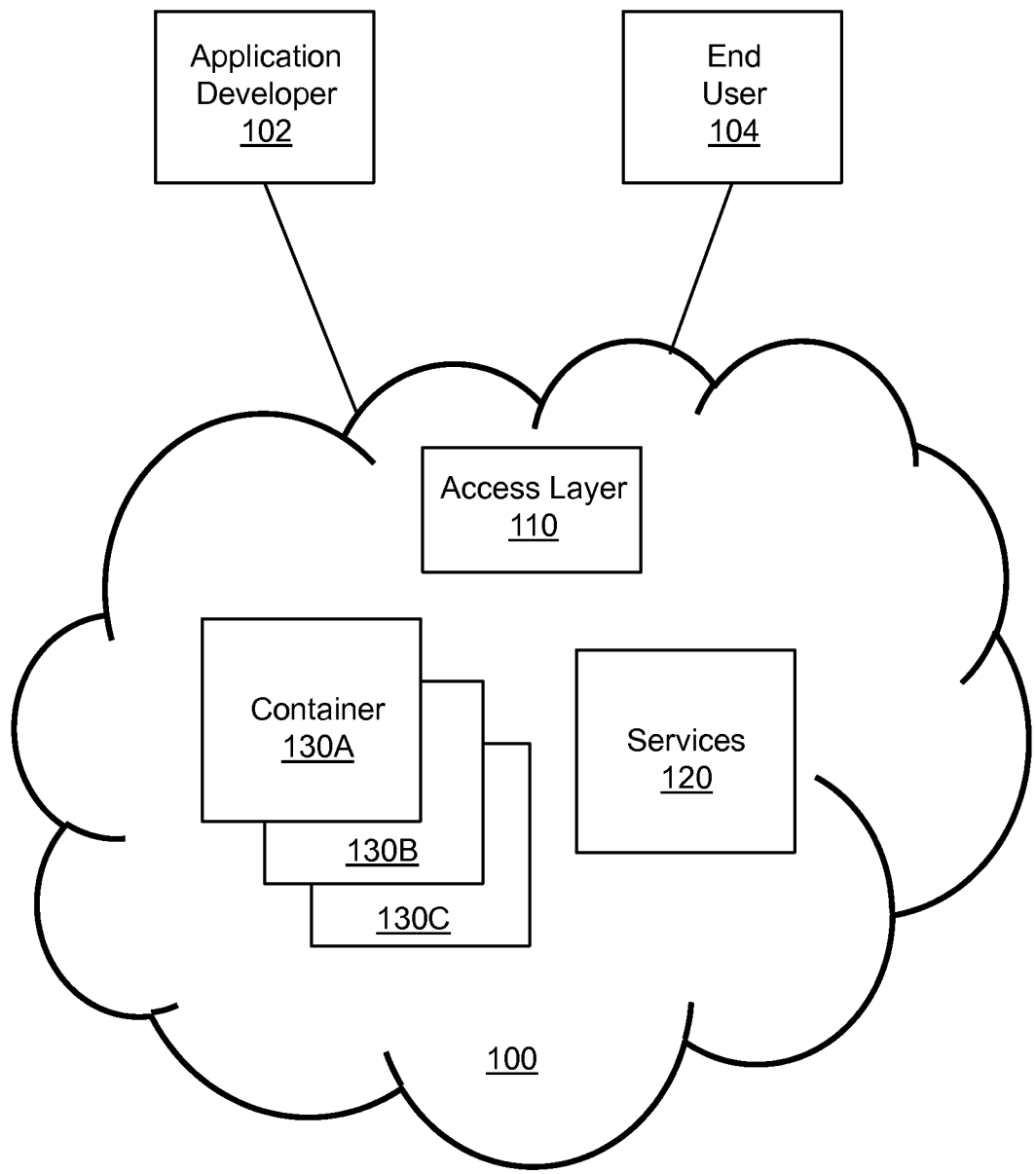
FIG. 1 illustrates a platform-as-a-service according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

The present invention is related to the IT services area and, thus many technology-specific terms are used in describing the invention and providing the environment in which it operates. Skilled artisans would understand the intended meaning of the technology-specific terms used below, however, the following, non-exhaustive list of term definitions is provided to assist the reader. Although the list below provides a general definition of the respective terms, the definitions provided are not meant to be limiting. That is, the definitions provided are not exclusive and one skilled in the art should apply alternative or modified definitions where appropriate.

Service provider: an entity providing a multitenant-enabled version of some service. The service provider establishes isolation requirements for components of the service. For example, XYZ Corporation is a service provider providing an application development and hosting service to its users.

Tenant: a user, group of related users, or a system that is entitled to use the service offered by the service provider through a platform. From the perspective of the tenant (also referred to herein as a "user", "first user", "tenant-user", "author", "owner", "client", or "customer"), the service is viewed as if the tenant is the service's only user or tenant, i.e., they are isolated from the other tenants on the system. Examples of tenants are WebSphere® sMash application developers and/or owners.

Service: a set of one or more components (also referred to herein as "service components") that together provide a utility or set of utilities to the tenants of the platform. For example, a service is a WebSphere® sMash development and execution environment for the creation of situational applications.

Platform: the set of systems and methods that multitenant-enable a service.

Isolation requirements: in order to ensure that one tenant's access to the service does not interfere with another tenant's use of the service, the service provider associates isolation requirements with the components of the service.

Virtualized environment: allows replication of parts of the service without having to resort to deploying the components on physical hardware. Virtualization allows the platform to create a unique copy of parts of the service for each tenant. Virtualized environments may be nested within one another. Examples of virtualization technology used include VMWare® and OpenVZ. A container is one type of virtualized environment.

Containers: virtualized environments used by components of the service that require the strongest isolation. Containers (also referred to herein as "tenant containers") have the highest level of isolation. For example, the assets related to an application developed by a developer within the context of the offered service are unique to that tenant and therefore must be isolated in a container that is associated with the particular tenant.

Shared components: require a lesser degree of isolation and may also be placed in virtualized environments, but in environments that can be shared by multiple tenants, e.g., code repository library for AppBuilder which is a resource that can accessed by all tenants. All tenants share an external IP address that is an entry point to the platform, but each tenant has a unique URL pattern and private IP address. An authentication service is shared across all tenants. A shared database is used to track information about each tenant container.

Shared container: a real or virtualized environment where at least one shared component lives and is granted appropriate isolation in the context of the platform.

FIG. 1 illustrates an efficient platform-as-a-service (also referred to herein as a platform, Software-as-a-Service, or SaaS) for rapidly developing and deploying situational applications according to an embodiment of the invention. The platform-as-a-service 100 is designed as a high-density, self-service platform offering a service (e.g., WebSphere® sMash) on a private, internal cloud. The platform supplies an integrated repository for sharing platform-specific resources between tenants, accessible from the platform-defined browser-based tooling.

Application developer(s) 102 and end user(s) 104 access value added services 120 at an access layer 110. The platform-as-a-service 100 includes containers 130A, 130B, and 130C (either shared and/or isolated). In at least one embodiment, the container 130A is an OpenVZ Kernel-virtualized container hosting WebSphere® sMash and the containers 130B and 130C are cloud virtual machine (VM) shared containers.

Figure 2:
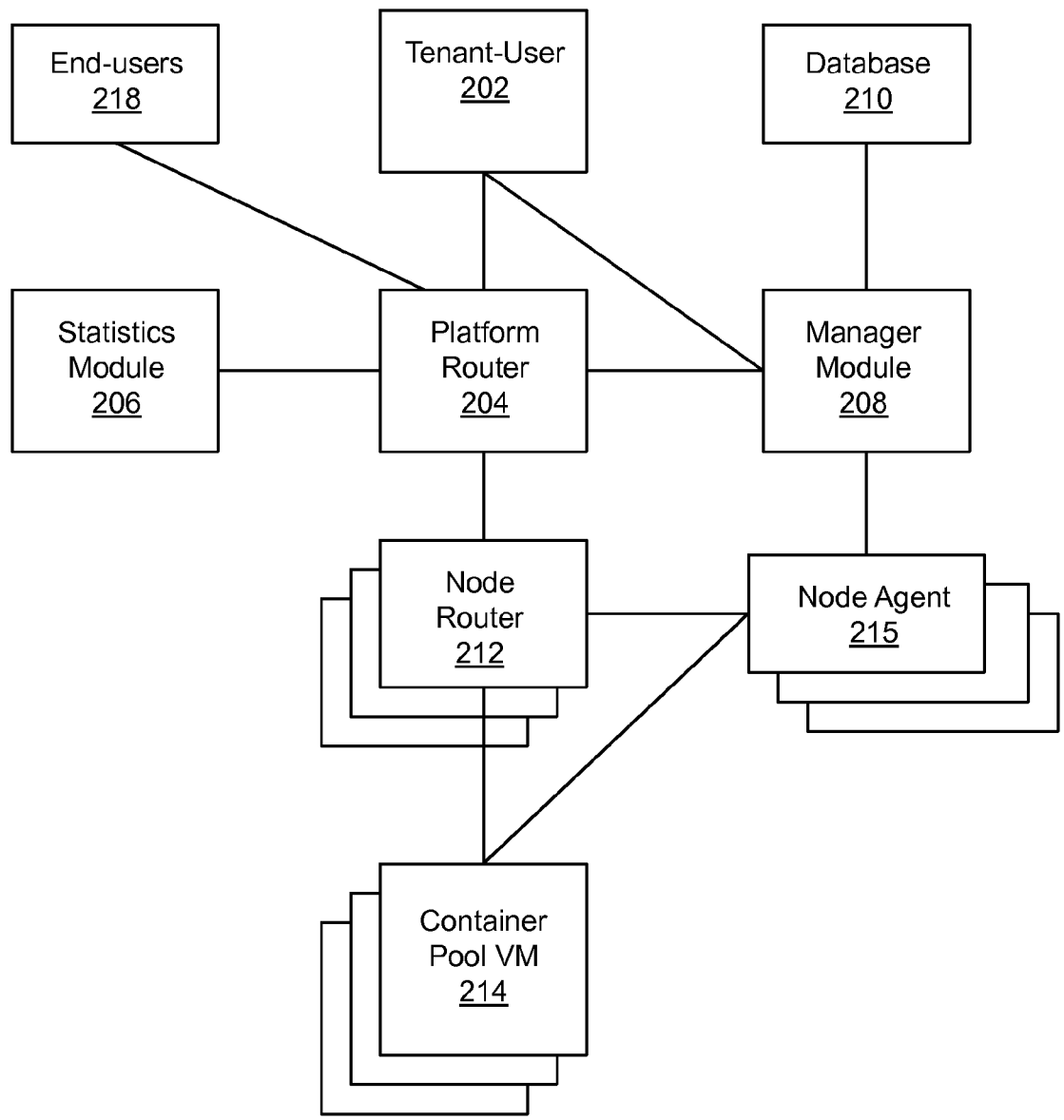
FIG. 2 illustrates components of a platform according to an embodiment of the invention.

FIG. 2 illustrates components of a platform according to an embodiment of the invention. In order to create a tenant container in an automated fashion, a developer and/or owner of an application (i.e., "tenant-user") 202 initiates provisioning of a container via a web interface, which is contained in a management module 208. A platform router 204 is connected to the management module 208 and a statistics module 206. All requests go through the platform router 204. As described more fully below, the infrastructure of the platform is configured to generate statistics reports that illustrate the use of deployed tenant applications.

The manager module 208 registers an entry (e.g., a database record) into a system database 210 and requests provisioning of the container in a container pool. One or more container pool node agents 215 are connected to one or more container pool VMs 214, one or more node routers 212, and the manager module 208. For example, in one embodiment a system includes node routers 212a, 212b, 212c, container pool VMs 214a, 214b, 214c, and node agents 215a, 215b, 215c, wherein each "a" component is associated with each respective "a" component, each "b" component is associated with each respective "b" component, and each "c" component is associated with each respective "c" component. For instance, the node router 212a is associated with the container pool VM 214a and the node agent 215a.

The node agents 215 handle provisioning of the tenant container and updating of the node routers 212 for the respective container pool VMs 214. The node agents 215 signal the manager module 208, which in turn updates the platform router 204 configuration. The isolation container pool VMs allow for (i.e., may be implemented through) full hypervisor virtualization. In at least one embodiment, tenant containers allow for kernel-level virtualization within the isolation containers pools (a "nested virtualization" technique). The manager module 208 indicates to the tenant-user 202 that the container is ready. The tenant-user 202 may proceed with use of the container (e.g., development, hosting of applications) through browser-based tooling. The hosted application may then be accessed by end users 218.

Figure 3:
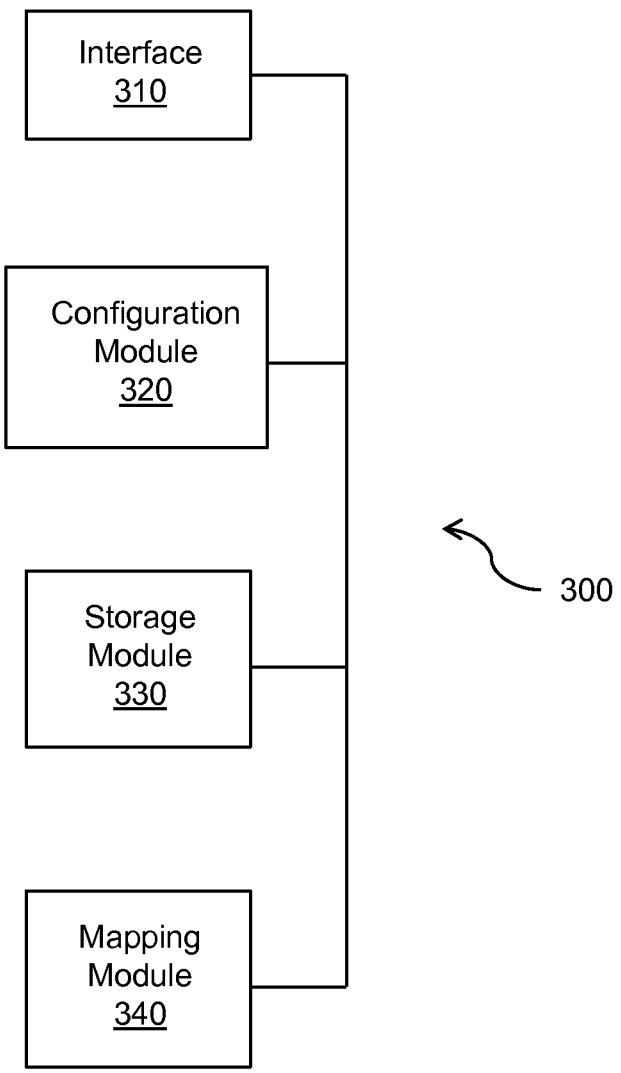
FIG. 3 illustrates a system for multi-tenant enabling a service according to an embodiment of the invention.
Figure 4:
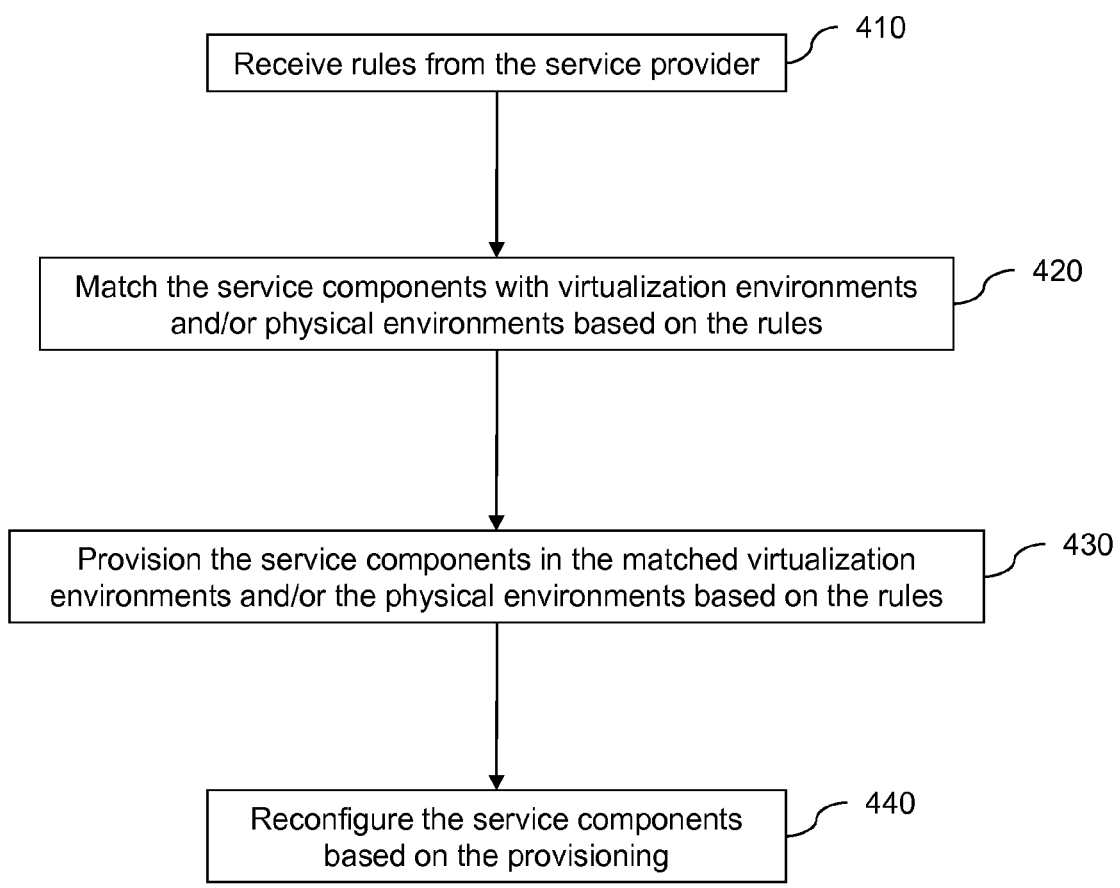
FIG. 4 is a flow diagram illustrating a method for multi-tenant enabling a service according to an embodiment of the invention.

FIG. 3 illustrates a system 300 for multi-tenant enabling a service according to an embodiment of the invention. FIG. 4 is a flow diagram illustrating a method for multi-tenant enabling a service according to an embodiment of the invention (e.g., using the system 300). As described above, a service is a set of one or more components that together provide a utility or set of utilities to tenants of a platform. For example, the service can enable the development and/or hosting of applications created by a first user and/or deployed by the first user as a function of the service.

The platform-defined set of services can be reconfigured, updated, and/or augmented by the platform owners through automation. In at least one embodiment, the platform-defined set of services are natively standalone services that have been extended with platform-specific extensions without modifying the original service. In another embodiment, the platform-defined set of services include browser-based, self-service administrative tools for tenants to configure their containers and/or components and restricts access by other means, such as preventing access via a command prompt shell.

The system 300 includes an interface 310 for receiving rules from the service provider (410). The interface 310 provides a means for manually installing a configuration for receiving the rules. The rules include rules for isolating components of the service and rules for sharing components of the service. The interface 310 is connected to a configuration module 320, wherein the configuration module 320 associates the rules with the service components. For example, rule R1 is silent as to service component C1 and defines that service component C2 is to be isolated and service component C3 is to be shared. Thus, the configuration module 320 associates rule R1 with service components C2 and C3, but not service component C1. Furthermore, the configuration module 320 matches the service components with virtualization environments and/or physical (real) environments based on the rules (420). Thus, in the example above, the service component C2 is matched to a virtualization environment having at least one isolation container; and, the service component C3 is matched to a virtualization environment having at least one shared container. An example of a virtualized environment is a VMWare® virtual machine on hardware. An example of a physical environment is an Intel®-based server that hosts the service components.

In at least one embodiment of the invention, the virtualization environments include one or more nested virtualization environments in a nesting (host) virtualization environment. As described above, each virtualization environment includes one or more isolation container and/or one or more shared container. The isolation containers have a higher level of isolation relative to the shared container; and, the shared containers have a higher level of sharing relative to the isolation container. As described above, in order to ensure that one tenant's access to the service does not interfere with another tenant's use of the service, the service provider associates isolation/sharing rules with the service components. In at least one embodiment, the isolation containers are assigned private-IP addresses. In another embodiment, the containers (isolation and/or shared) are configured to specify URL (web address) patterns that define access to one or more application resources supplied and stored by the containers.

In at least one embodiment of the invention, an isolation container is deployed on a virtualization or physical host environment from a pool of one or more virtualization or physical host environments. In another embodiment, the initial configuration of a container (isolation or shared) can be extended by tenants at will by acquiring additional component libraries and/or upgrading existing component libraries, which may include runtime libraries from a repository.

The system 300 further includes a storage module 330 connected to the configuration module 320, wherein the storage module 330 provisions (stores) the service components in the matched virtualization environments and/or the physical environments based on the rules (430). In at least one embodiment, the service provisioning occurs as demanded by the platform or tenant, through a web interface or programmatic interface (e.g., API). In another embodiment, the provisioning and configuration of the service components yields a platform-defined set of applications for development and administration as well as an execution environment with supporting runtime libraries (e.g., a WebSphere® sMash development and runtime environment).

The storage module 330 is also connected to a mapping module 340 that maps (reconfigures/rewires) the service components based on the provisioning performed by the storage module 330 (440). For example, service S includes service components S1, S2, and S3. Based on the rules, service component S1 is stored in container C10, service component S2 is stored in container C8, and service component S3 is stored in container C17. Thus, the mapping module 340 rewires the service components S1, S2, and S3 such that, when a user requests the service S, the request can be routed to the appropriate containers within the virtualization environment. In at least one embodiment, the configuration of the service components adheres to platform rules where URL patterns define access points to the service (i.e., generic service). This specifies the platform's configuration URL patterns that must be abided by in the configuration steps.

When a request for the service is received from an end-user, the request is routed to the service components based on the mapping. In at least one embodiment, the configuration of the routing directs requests to the service components via HTTP URLs through the nested virtualization environment into the respective tenant container. The configuration of the routing denies access to requests that do not conform to the established platform-defined HTTP patterns. In addition, access to service components is based on roles, such as host administrator, author, tenant owner, associate owners, and application end-users.

In at least one embodiment of the invention, the deployment of tenant containers on the platform infrastructure is automated and includes generation of statistics reports (e.g., from statistics module 206) that illustrate the use of the services deployed in the platform and/or shared services. Moreover, the configuration of the infrastructure enables security services for deployed tenant applications.

In at least one embodiment of the invention, an isolation container is matched to a kernel-virtualized environment to define a particular virtualization technology for isolation containers (i.e., kernel-virtualization). For example, isolation containers and host environments (real or virtual) may leverage a combination of Linux® distributions (i.e., use an operating system using a Linux® kernel). For instance, the isolation containers may use Red Hat® Linux® kernel and the host environment may use a Centos Linux® kernel.

The following provides an exemplary use of the system 300 for multi-tenant enabling a service, wherein the service includes service components A, B, C, and D. The interface 310 receives rules from a service provider, wherein the rules define that service components A, B, and D must be isolated and service component C must be shared.

A virtualized environment includes isolation containers IC1 and IC2, and shared container SC1. The configuration module 320 matches the service components with virtualization environments based on the rules. More specifically, the configuration module 320 matches service component C with the shared container SC1 and matches service components A, B, and D with isolation containers IC1 and/or IC2. FIGS. 5A and 5B are tables illustrating fourteen different matching scenarios according to an embodiment of the invention.

The storage module 330 stores the service components A, B, C, and D in the virtualization environment based on the matching. The mapping module 340 maps the service components A, B, C, and D to the appropriate containers of the virtualization environment (i.e., IC1, IC2, and SC1) based on the matching/storing (i.e., according to one of the scenarios illustrated in FIGS. 5A and 5B). Thus, when a request for the service is received from an end-user, the request is routed to the containers having the appropriate service components based on the mapping performed by the mapping module 340.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
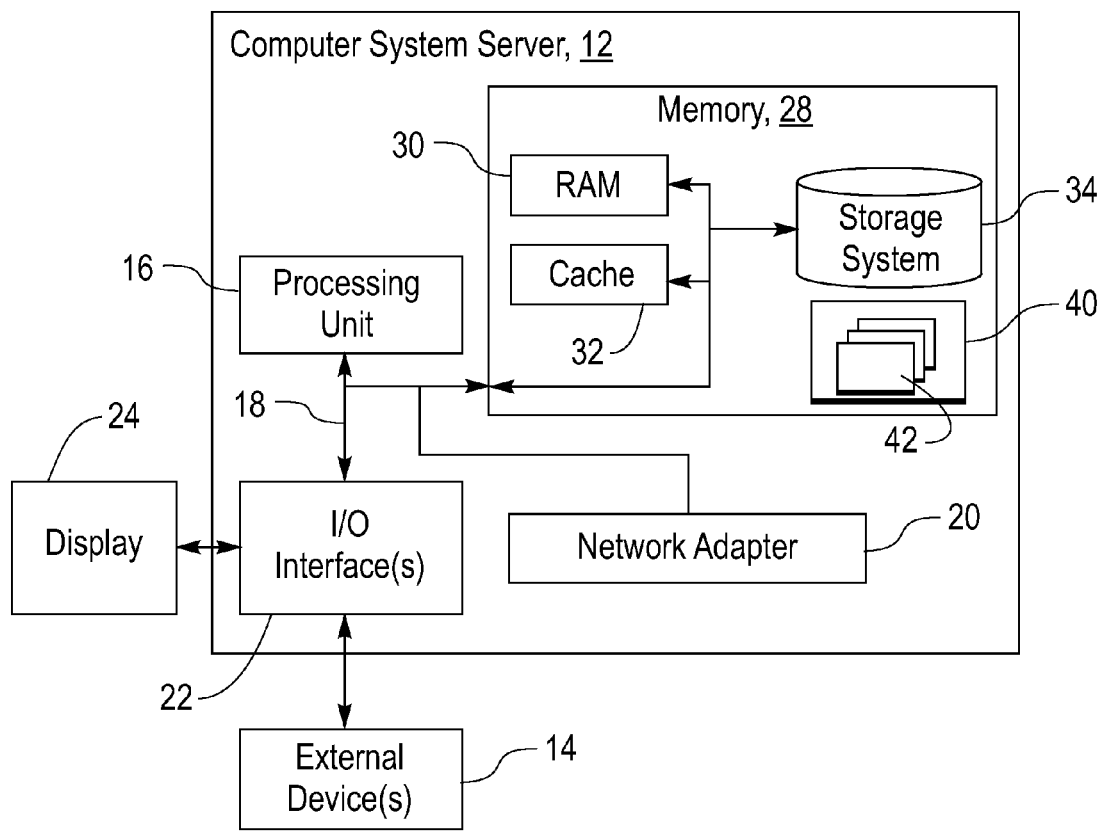
FIG. 6 depicts a cloud computing node according to an embodiment of the invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 7:
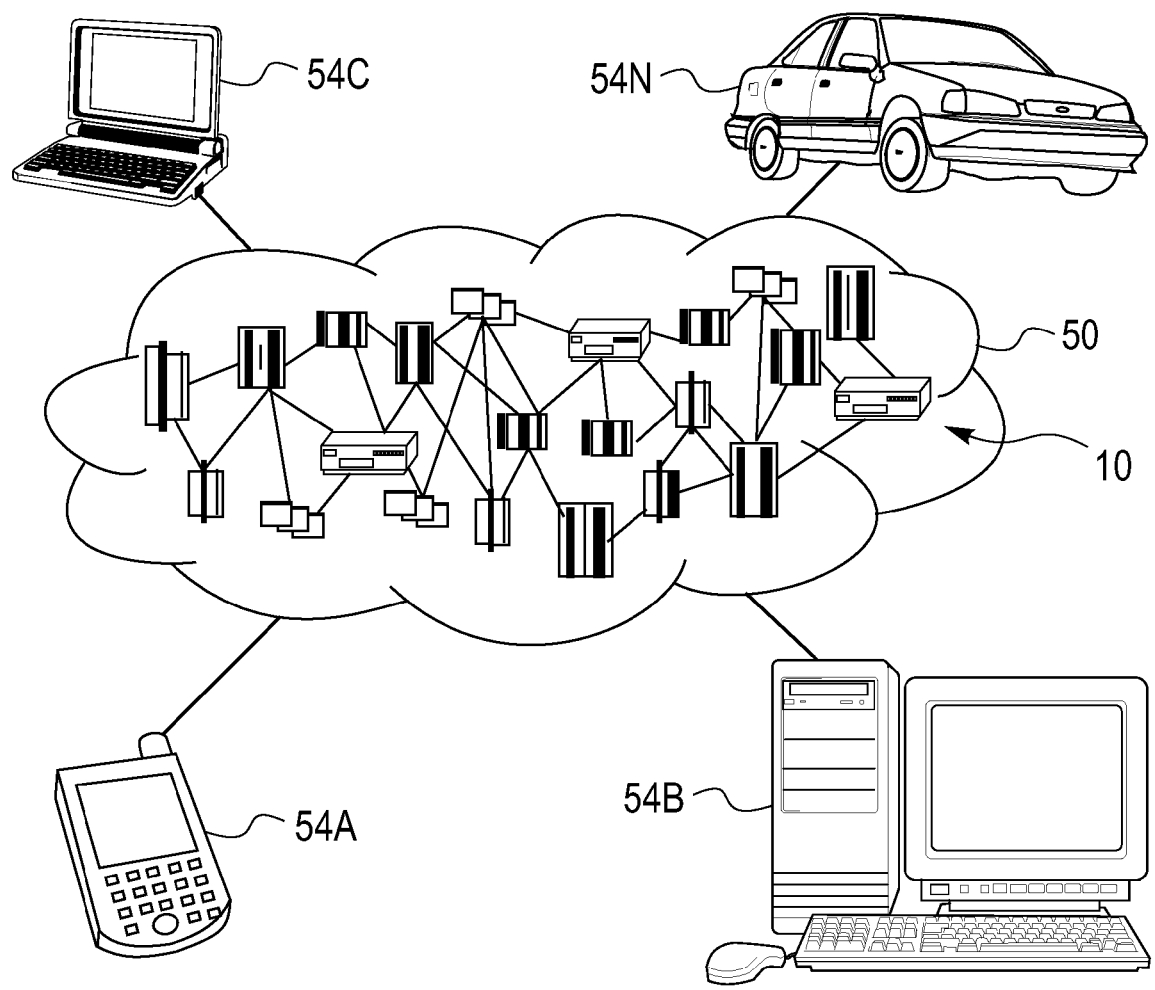
FIG. 7 depicts a cloud computing environment according to an embodiment of the invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
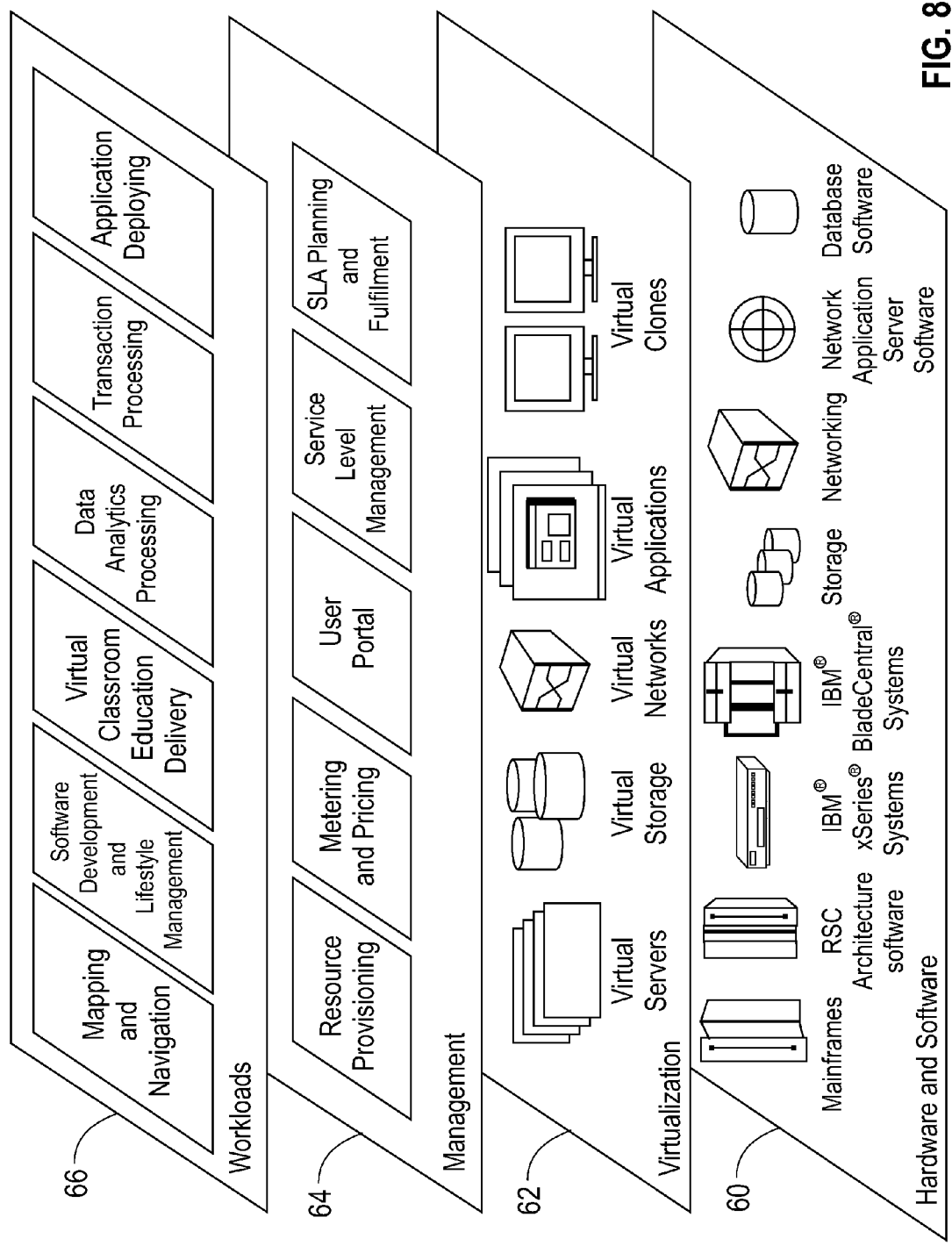
FIG. 8 depicts abstraction model layers according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated deployment of application with tenant-isolation requirements.

Figure 9:
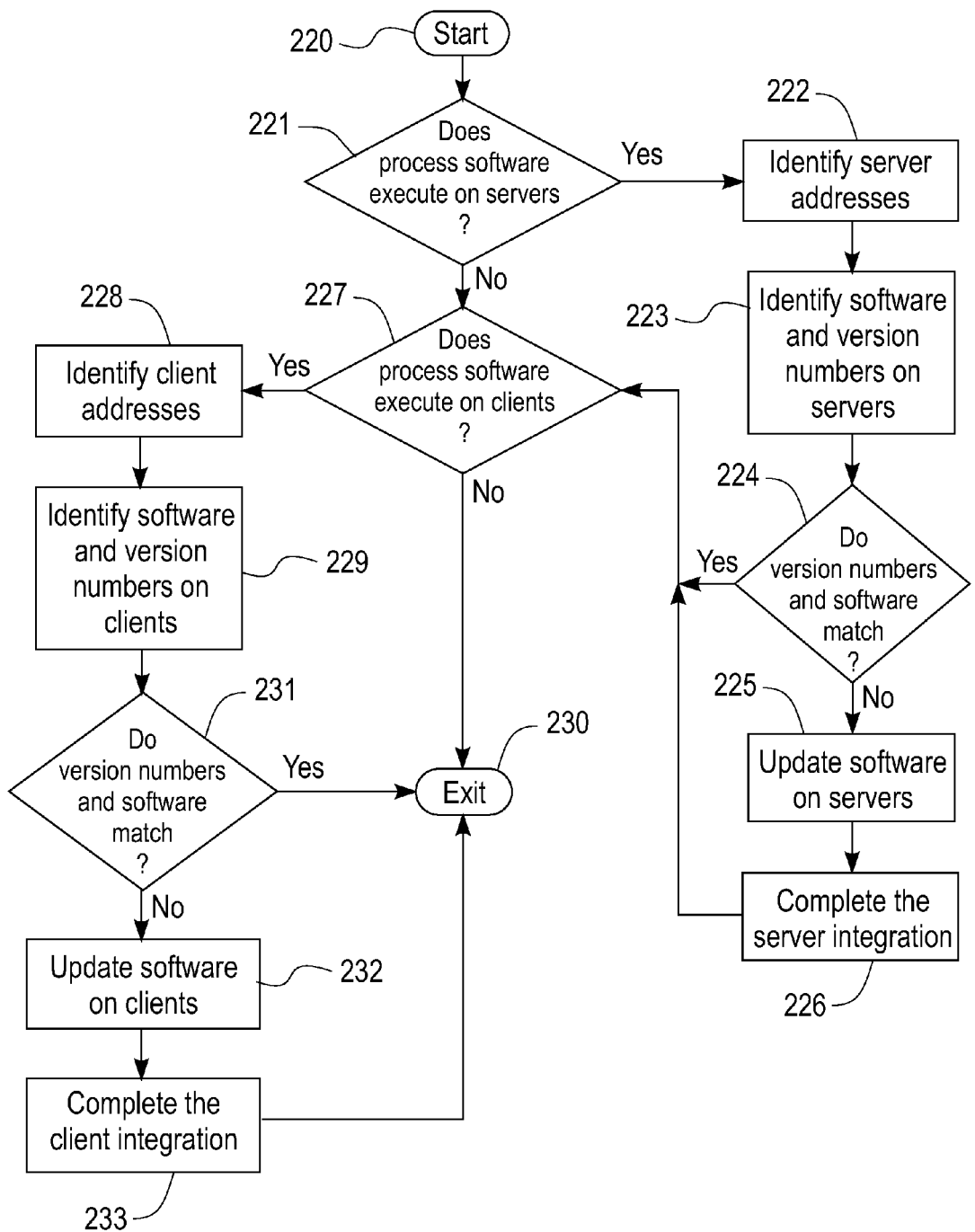
FIG. 9 illustrates a system for integration according to an embodiment of the invention.

FIG. 9 illustrates a system for integration according to an embodiment of the invention. The process software which consists of, for example, an operating system using a Linux® kernel, is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Step 220 begins the integration of the process software. The first thing is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications and NOS that have been tested with the process software (224). If all of the versions match and there is no missing required software the integration continues in (227).

If one or more of the version numbers do not match, then the unmatched versions are updated on the server or servers with the correct versions (225). Additionally if there is missing required software, then it is updated on the server or servers (225). The server integration is completed by installing the process software (226).

Step 227, which follows either 221, 224 or 226, determines if there are any programs of the process software that will execute on the clients. If no process software programs execute on the clients, then the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made is the version numbers match the version numbers of OS, applications and NOS that have been tested with the process software (231). If all of the versions match and there is no missing required software, then the integration proceeds to 230 and exits.

If one or more of the version numbers do not match, then the unmatched versions are updated on the clients with the correct versions (232). In addition, if there is missing required software then it is updated on the clients (232). The client integration is completed by installing the process software on the clients (233). The integration proceeds to 230 and exits.

Figure 10:
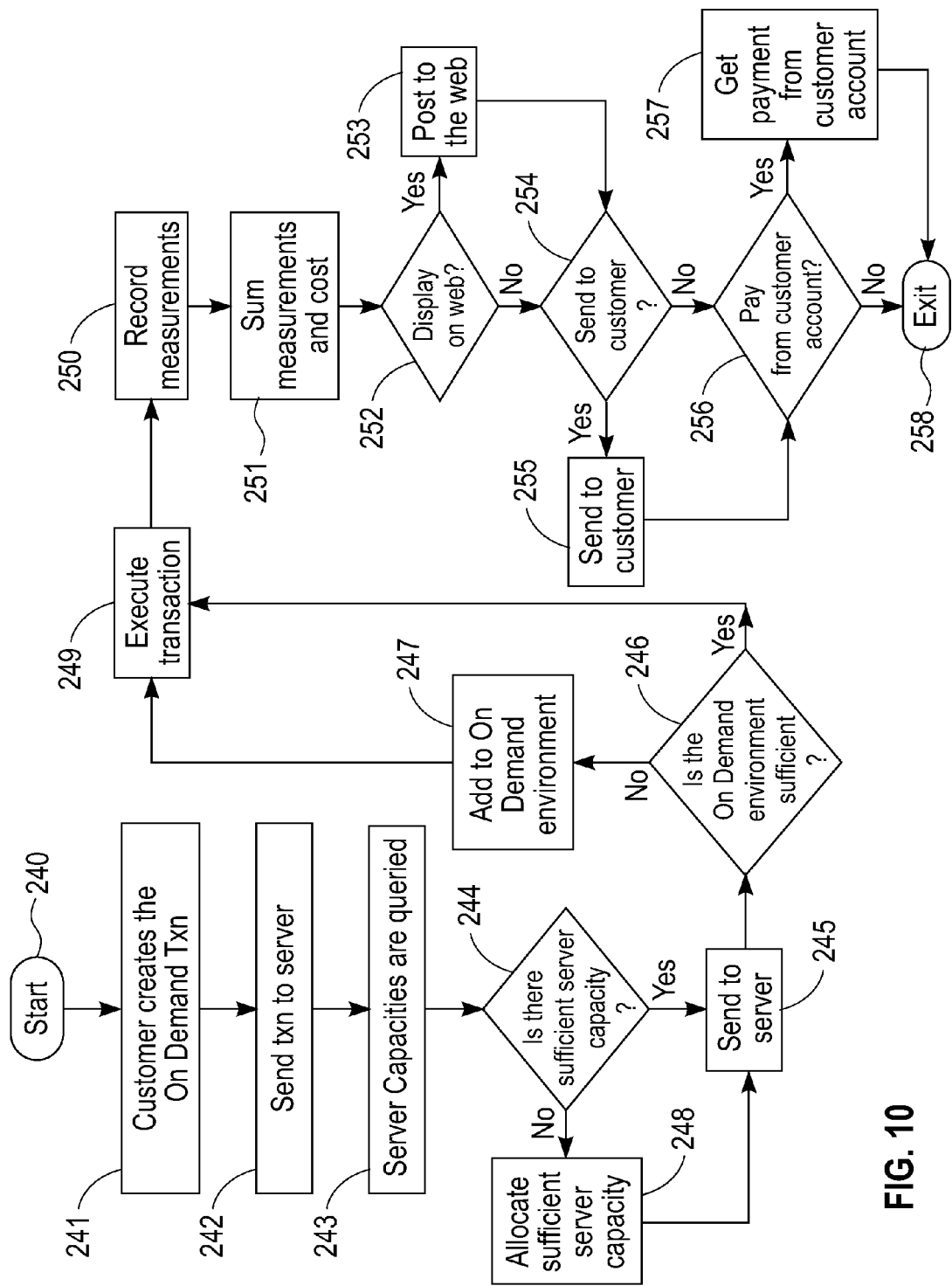
FIG. 10 illustrates a system for on demand according to an embodiment of the invention.

FIG. 10 illustrates a system for on demand according to an embodiment of the invention. The process software, for example, an operating system using a Linux® kernel, is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server (e.g., statistics module 206) that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 240 begins the On Demand process. A transaction is created than contains the unique customer identification, the requested service type and any service parameters that further specify the type of service (241). The transaction is then sent to the main server (242). In an On Demand environment the main server can initially be the only server, and then as capacity is consumed other servers are added to the On Demand environment.

The server central processing unit (CPU) capacities in the On Demand environment are queried (243). The CPU requirement of the transaction is estimated, then the server's available CPU capacity in the On Demand environment is compared to the transaction CPU requirement to see if there is sufficient CPU available capacity in any server to process the transaction (244). If there is not sufficient server CPU available capacity, then additional server CPU capacity is allocated to process the transaction (248). If there was already sufficient Available CPU capacity then the transaction is sent to a selected server (245).

Before executing the transaction, a check is made of the remaining On Demand environment to determine if the environment has sufficient available capacity for processing the transaction. This environment capacity consists of such things as but not limited to network bandwidth, processor memory, storage, etc. (246). If there is not sufficient available capacity, then capacity will be added to the On Demand environment (247). Next the required software to process the transaction is accessed, loaded into memory, and then the transaction is executed (249).

The usage measurements are recorded (e.g., by statistics module 206) (250). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (251).

If the customer has requested that the On Demand costs be posted to a web site (252) then they are posted (253). If the customer has requested that the On Demand costs be sent via e-mail to a customer address (254) then they are sent (255). If the customer has requested that the On Demand costs be paid directly from a customer account (256) then payment is received directly from the customer account (257). The last step is exit the On Demand process (258).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
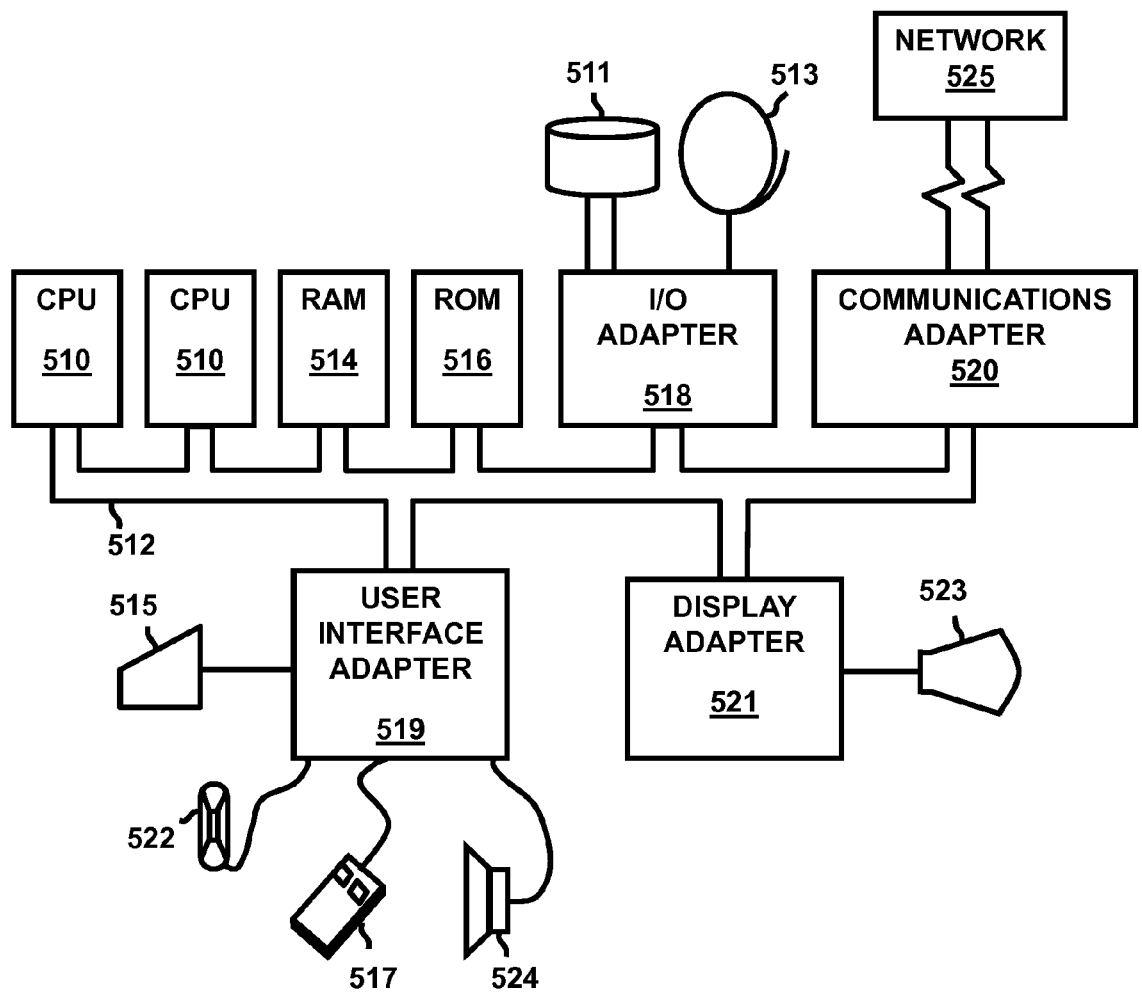
FIG. 11 illustrates a computer program product according to an embodiment of the invention.

Referring now to FIG. 11, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 510. The CPUs 510 are interconnected with system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of at least one embodiment of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for multi-tenant enabling a service, said method comprising:
   receiving rules from a provider of the service, the service including a plurality of components, the rules including rules for isolating the components of the service and rules for sharing the components of the service;
   associating the rules with the components of the service;
   automatically matching the components of the service with virtualization environments and physical environments, the virtualization environments including at least one isolation container and at least one shared container, said virtualization environments including a plurality of nested virtualization environments in a nesting virtualization environment;
   automatically provisioning the components of the service in the matched at least one isolation container, the matched at least one shared container, and the matched physical environments based on the rules, such that the components of the service are stored in the matched at least one isolation container, the matched at least one shared container, and the matched physical environments;
   automatically reconfiguring the components of the service based on said provisioning of the components of the service; and
   sharing platform-specific resources between tenants of a platform via an integrated repository of the platform.

2. The method of claim 1, wherein the service enables developing of applications and hosting of the applications, wherein the applications are at least one of created by a tenant and deployed by the tenant as a function of the service.

3. The method of claim 1, further including: permitting access to the platform via platform-defined browser-based tooling.

4. The method of claim 1, wherein the service includes browser-based, self-service administrative tools for
   allowing tenants to configure at least one of tenant containers and tenant components and
   restricting access via a command prompt shell.

5. A method for multi-tenant enabling a service, the service including a plurality of service components, said method comprising:
   receiving rules from a provider of the service, the rules including rules for isolating the service components and rules for sharing the service components;
   matching the service components with virtualization environments based on the rules, said virtualization environments including at least one nested virtualization environment in a nesting virtualization environment, the virtualization environments including:
   at least one isolation container, and
   at least one shared container, the at least one shared container comprising shared components, the shared components being shared by all tenants of the service;
   storing the service components in the at least one isolation container and the at least one shared container of the virtualization environments based on said matching;
   mapping the service components to the at least one isolation container and the at least one shared container of the virtualization environments based on said storing of the service components; and
   sharing platform-specific resources between tenants of a platform via an integrated repository of the platform.

6. The method of claim 5, further comprising:
   matching physical environments with the service components;
   storing the service components in the physical environments based on said matching of the physical environments; and
   mapping the service components to the physical environments based on said storing of the service components in the physical environments.

7. The method of claim 6, wherein at least one of the physical environments, the virtualization environments, and an isolation container of the physical environments uses an operating system including a Linux kernel.

8. The method of claim 5, further comprising:
   receiving a request for the service from an end-user; and
   routing the request to the service components based on said mapping.

9. The method of claim 5, further including at least one of developing applications with the service and hosting the applications with the service, wherein the applications are at least one of created by a first user and deployed by the first user as a function of the service.

10. The method of claim 5, wherein said isolation container includes a higher level of isolation relative to said shared container, and wherein said shared container includes a higher level of sharing relative to said isolation container.

11. The method of claim 5, further including receiving a request to provision the service components from at least one of a first user and the provider of the service, wherein said storing of the service components is performed based on the request.

12. The method of claim 5, further including extending an initial configuration of a container by a first user, said extending of the initial configuration including at least one of acquiring additional component libraries and upgrading existing component libraries.

13. The method of claim 5, wherein the service includes a natively standalone service extended with platform-specific extensions.

14. A method for multi-tenant enabling a service, the service including a plurality of service components, said method comprising:
   receiving rules from a provider of the service with an interface, the rules including rules for isolating the service components and rules for sharing the service components;
   matching the service components with virtualization environments and physical environments with a configuration module based on the rules, the virtualization environments including at least one nested virtualization environment in a nesting virtualization environment, the virtualization environments including:
      at least one isolation container, and
      at least one shared container, the at least one shared container comprising shared components, the shared components being shared by all tenants of the service, the isolation container including a higher level of isolation relative to the shared container, and the shared container including a higher level of sharing relative to the isolation container;
   storing the service components in the at least one isolation container and the at least one shared container of the virtualization environments and the physical environments with a storage module, said storing of the service components being based on said matching;
   mapping the service components with a mapping module to the at least one isolation container of the virtualization environments, the at least one shared container of the virtualization environments, and the physical environments based on said storing of the service components;
   receiving a request for the service from an end-user with a second interface;
   routing the request to the service components with a router based on said mapping; and
   sharing platform-specific resources between tenants of a platform via and integrated repository of the platform.

15. A system for multi-tenant enabling a service, said system comprising:
   one or more processors;
   an interface for receiving rules from a provider of the service, the rules including rules for isolating the service components and rules for sharing the service components;
   a configuration module connected to said interface, said configuration module matches the service components with virtualization environments based on the rules, the virtualization environments including at least one nested virtualization environment in a nesting virtualization environment, the virtualization environments including:
      at least one isolation container, and
      at least one shared container;
   a storage module connected to said configuration module, said storage module stores the service components in the at least one isolation container and the at least one shared container of the virtualization environments based on the matching performed by said configuration module;
   a mapping module connected to said storage module, said mapping module maps the service components to the at least one isolation container and the at least one shared container of the virtualization environments based on the storing performed by said storage module; and
   sharing platform-specific resources between tenants of a platform via an integrated repository of the platform.

16. The system of claim 15, further comprising:
   a second interface for receiving a request for the service from an end-user; and
   a router connected to said second interface for routing the request to the service components based on the mapping performed by said mapping module.

17. The system of claim 15, further including a statistics module for generating at least one statistics report, the statistics report including statistics of use of the service.

18. A computer program product for multi-tenant enabling a service, the service including a plurality of service components, said computer program product including:
   a non-transitory computer readable storage medium;
   first program instructions to receive rules from a provider of the service, the rules including rules for isolating the service components and rules for sharing the service components;
   second program instructions to match the service components with virtualization environments based on the rules, the virtualization environments including at least one nested virtualization environment in a nesting virtualization environment, the virtualization environments including
      at least one isolation container and
      at least one shared container;
   third program instructions to store the service components in the at least one isolation container and the at least one shared container of the virtualization environments based on said matching;
   fourth program instructions to map the service components to the at least one isolation container and the at least one shared container of the virtualization environments based on said storing of the service components, said first program instructions, said second program instructions, said third program instructions, and said fourth program instructions are stored on said computer readable storage medium; and
   sharing platform-specific resources between tenants of a platform via an integrated repository of the platform.

19. The method of claim 5, wherein the at least one shared container comprises shared components, the shared components being shared by all tenants of the service.

* * * * *